United States Patent Office 3,077,552
Patented Feb. 12, 1963

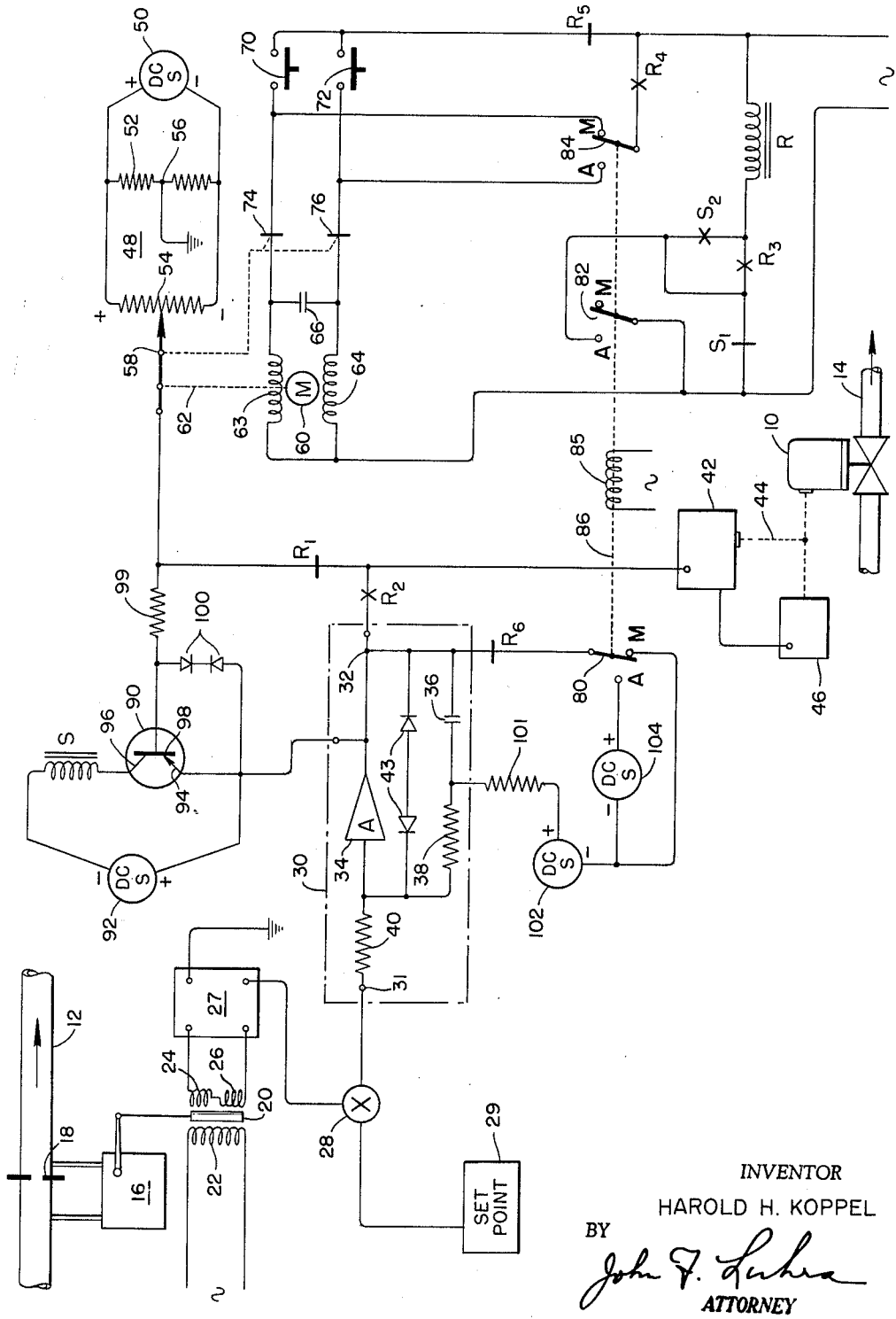

3,077,552
MOTOR CONTROL SYSTEM
Harold H. Koppel, South Euclid, Ohio, assignor to Bailey Meter Company, a corporation of Delaware
Filed Apr. 29, 1960, Ser. No. 25,589
20 Claims. (Cl. 318—28)

This invention relates to control apparatus and more particularly to apparatus for transferring a control system from one method of control to another without inroducing an upset into the control system.

The alternating use of two or more methods of control in a control system is well known to those skilled in the art. For example, a provision for alternate or possible alternate use of two different servo mechanisms on controllers is often desired so that in the event of failure of one mechanism a reserve mechanism will be available to maintain the control system in operation. Another example of the alternate use of two different methods of control is in a control system where provision is made for both automatic control in accordance with variations in the magnitude of a variable and manual control by an operator. At times it is desired to operate the control system manually and a transfer from automatic to manual control is made through the provision of a suitable transfer switch which is also effective to return the system to automatic control upon actuation at the end of the period of manual operation.

In transferring control of a final control element from one method of control to another, it is essential that the outputs of the two controllers be equalized before the transfer is made to avoid the introduction of an upset into the control system. In the past this equalization has been generally accomplished manually. Circuits have been designed to accomplish the equalization of the controller outputs automatically but for the most part the circuits are extremely complicated and often only operate satisfactory when transferring control in one direction such as from automatic to manual control.

It is a principal object of this invention to effect an automatic transfer of a control system from one method of control to another and vice versa without introducing an upset into the control system.

Another object of the invention is to provide an improved automatic transfer selector station for transferring control of a variable from one controller to another.

Still another object of the invention is to effect an automatic bumpless transfer of control from one controller to another in either direction by establishing a voltage sweep of the output of the controller to which control is to be transferred and transferring control at coincidence of the controller outputs during the voltage sweep.

Other objects and advantages will become apparent from the following description taken in connection with the accompanying drawing which is a schematic illustration of a control apparatus embodying this invention, Referring more particularly to the drawing, there is shown a single element control system comprising a final control element or valve 10 which is actuated in accordance with variations in the flow rate of fluid in a conduit 12 to control the flow rate of fluid in conduit 14. A transmitting device 16 is responsive to the flow rate of fluid in conduit 12 as is represented by the differential pressure across a primary measuring element 18 and is effective to actuate the movable core 20 of a movable core transformer having a primary winding 22 and a pair of serially connected, oppositely wound secondary windings 24 and 26. The primary winding 22 is connected across a suitable source of alternating voltage as indicated schematically while the secondary windings 24 and 26 are coupled to a demodulator 27.

With this arrangement a modulated signal is supplied to the input of the demodulator 27 with a carrier frequency corresponding to the frequency of the A.-C. source, the modulated amplitude of the signal being proportional to the flow rate of the fluid in conduit 12. Transmitting devices of this nature are well known to those skilled in the art and, therefore, further description is deemed unnecessary.

The demodulator 27 is effective to remove the A.-C. carrier signal to establish a variable D.-C. signal at its output terminals proportional to the flow rate in conduit 12. The transmitting device 16 and demodulator 27 may be calibrated to produce any desired range and level of direct voltage at the output terminals of demodulator 27 in the range of flow rates encountered. As disclosed in Hornfeck et al. application Serial No. 805,019, filed on April 8, 1959, this direct voltage signal may be caused to vary in the range of —25 to +25 volts.

The output signal of demodulator 27 is compared with a manually adjustable set point signal at a summing junction 28 to produce an error signal representative of the deviation of the magnitude of the flow rate from a desired set point. The set point signal is established by a circuit 29 which may comprise a suitable potentiometer circuit having a manually adjustable contact arm (not shown).

The error signal established at junction 28 is impressed on the input terminals of a controller 30 which may be composed of one or more plug-in control action units of the type disclosed in Hornfeck et al. application Serial No. 805,019. As disclosed in said copending application, the control relay 30 may employ one or more D.-C. amplifier circuits of the type disclosed and claimed in Koppel et al. application Serial No. 770,710, filed on October 30, 1958. The particular controller 30 shown in the drawing comprises a single plug-in control action unit having proportional plus reset characteristics for producing an output signal at terminal 32 proportional to the integral of the input signal to the controller 30. More particularly, the controller 30 comprises a high gain, low output impedance D.-C. amplifier 34 having an external negative feedback circuit comprising a capacitor 36 connected in series with a resistor 38 between the output terminal 32 and input terminal 31. The error signal established at junction 28 is applied to a resistor 40 connected in series with the input terminal 31. A pair of Zener diodes 43 are connected in series across the feedback circuit to limit the output signal of the controller 30 to a predetermined range such as +25 to —25 volts.

As is described in more detail in copending application Serial No. 805,019, the relative sizes of resistors 38 and 40 determines the gain of the controller 30 while reset or integral action is achieved through the provision of capacitor 36. For a more complete description of the operation of such a controller, reference is made to this co-pending application.

By means of the transfer or selector station later to be described the output voltage signal of the controller 30 is applied to a positioning device 42 which is effective to position the valve 10 by means of linkage 44 in accordance with variations in the output voltage of controller 30. A valve position feedback transmitter 46 is effective to establish a voltage signal in the range of the output voltage signal of the controller 30 which is compared with the controller 30 output signal in the positioning device 42 to establish an error signal for positioning the valve 10. The positioning device 42, linkage 44, and valve position feedback transmitter 46 form a voltage balance positioning system of the type disclosed in Patent 3,015,768 to Anthony J. Hornfecket et al., and reference is made to said patent for a complete description of the structure and operation of such a positioning system.

With the apparatus thus far described the valve 10 will be positioned by the positioning device 42 in response to variations in the flow rate in conduit 12 as sensed by measuring element 18. As an alternate method of controlling the valve 10 there is shown a manual controller 48 which is adapted to establish a manually adjustable output voltage signal. More particularly, the controller 48 comprises a source of D.-C. voltage 50 across which is connected in parallel a pair of resistors 52 and 54. The resistor 52 is provided with a grounded center tap 56 while the resistor 54 comprises a slidewire resistor having a movable contact arm 58 connected to the positioning device 42. The resistors 52 and 54 in combination with the source 50 form a potentiometer circuit which will produce a variable voltage on contact arm 58 relative to the center tap 56, the magnitude of the output voltage signal depending on the position of the contact arm 58. Preferably the manual controller output voltage on contact arm 58 is adjustable through the same range as the controller 30 output. Thus, the potentials of the upper and lower ends of the slidewire 54 is preferably +25 and −25 volts respectively relative to the grounded center tap 56.

The contact arm 58 is arranged to be positioned by a reversible electric motor 60 through connecting linkage 62. The motor 60 is provided with the usual energizing windings 63 and 64 and phase shifting capacitor 66 connected in an electric circuit across a suitable source of alternating voltage. Energization of the windings 63 and 64 is controlled manually by a pair of normally open pushbutton switches 70 and 72. Closure of switch 70 is effective, depending upon the condition of other switches in the circuit which will later be described, to connect the energizing winding 63 directly across the voltage source and to connect the winding 64 in series with the capacitor 66 across the voltage source. As a result a 90° phase relationship will be established between the windings 63 and 64 causing the motor 60 to rotate and position the contact arm 58 in one direction toward the lower end of the slidewire 54. Similarly, closure of switch 72 is effective to connect the winding 64 directly across the source 68 and energize the winding 63 in series with the capacitor 66 to reverse the phase relationship of the windings 63 and 64. As a result the motor 60 will rotate in the opposite direction to effect actuation of the contact arm 58 in the opposite direction. With this circuitry the operator may manually control the position of contact arm 58 and the manual control signal by selectively closing switches 70 and 72.

A pair of normally closed limit switches 74 and 76 are connected in series with the switches 70 and 72 respectively and are opened by the contact arm 58 at the upper and lower ends of the slidewire 54 to break the energizing circuit for the motor 60 established by the associated switches 70 and 72. With this arrangement overtravel of the contact arm 58 and possible damage to the slidewire 54 is avoided.

The transfer device or selector station includes three single pole, double throw switches 80, 82 and 84 which are mechanically coupled by linkage 86 to be actuated simultaneously as a unit. The switches 80, 82 and 84 may be manually actuated by the operator or comprise contacts of a suitable relay having an operating coil 85 arranged to be energized by electrical impulse from a computer or other control center (not shown). Each switch is provided with a movable contact arm and a pair of fixed contacts which are designated by reference letters A and M to indicate the "Automatic" and "Manual" positions of the movable contact arms. During manual operation of the valve 10 the movable contacts of switches 80, 82 and 84 engage fixed contacts M as shown in the drawing. When it is desired to transfer to automatic operation the switches 80, 82 and 84 are actuated to cause their movable contacts to engage the associated contacts A respectively.

The switch 82 is connected in series with a main transfer relay R having contacts $R_1$, $R_2$, $R_3$, $R_4$, $R_5$ and $R_6$ which assume the normally open or closed positions as indicated schematically on the drawing during deenergization of the relay coil. Normally closed contacts $R_1$ are effective during deenergization of relay R to connect the contact arm 58 to the positioning device 42 to effect manual control of the valve 10 while the normally open contacts $R_2$ are effective during energization of relay R to connect the output of controller 30 to the positioning device 42 to effect automatic control of valve 10.

A second relay S is responsive to a condition of coincidence of the outputs of controllers 30 and 48 and is adapted to be temporarily energized to effect transfer of control from one controller to the other by energizing or deenergizing relay R. To this end the relay S is provided with contacts $S_1$ and $S_2$ associated with the energization circuit for relay R to control energization thereof as will later be described. The contacts $S_1$ are illustrated in their normal position assumed during deenergization of relay S.

A transistor 90 is operative as an electronic switch to energize relay S substantially at the instant of coincidence of the outputs of controllers 30 and 48. More particularly, the transistor 90 is connected in series with the relay S across a D.-C. voltage source 92. The emitter 94 of transistor 90 and positive side of the source 92 are connected to the output of controller 30. The collector 96 of the transistor 90 is connected to the relay coil S. The base electrode 98 of the transistor 90 is connected through a resistor 99 to the movable contact arm 58 of the manual controller 48.

With this circuit arrangement of transistor 90 no current will flow through the relay coil S as long as the potential of the base 98 (manual control voltage) is more positive than the potential of the emitter 94 (automatic control voltage). However, if the base potential is slightly more negative than the emitter potential by as little as 0.2 volt the transistor 90 will conduct to cause an energizing current to flow through the relay S. To prolong the life of transistor 90 a pair of Zener diodes 100 are serially connected across the base 98 and emitter 94 to limit the maximum base to emitter potential to approximately 5 volts thereby causing the resistor 99 to absorb as a voltage drop the voltage difference of the manual and automatic control voltages in excess of 5 volts.

In general during automatic operation the contact arm 58 is retained at the upper positive end of the slidewire 54 by means of a circuit established by switch 84 to cause the manual control voltage to be at its maximum positive value of +25 volts and the base potential of transistor 90 to have a maximum positive potential to prevent the transistor 90 from conducting. Thus during automatic operation the base 98 of transistor 90 is prevented from becoming negative with respect to the emitter 94 and the relay S cannot be energized. As will later be described, however, actuation of the switches 80, 82 and 84 is effective to release the contact arm 58 and effect movement thereof toward the lower negative end of the slidewire 54 to cause the manual control voltage to undergo a voltage sweep toward the negative end of its range. As the manual control voltage becomes more negative during this voltage sweep operation of a point of coincidence will be reached where the two controller output voltages are substantially equal. At this condition when the manual control voltage becomes slightly negative with respect to the automatic control voltage the transistor 90 will conduct to energize the relay coil S and effect transfer of control from controller 30 to controller 48 through the agency of relay R as will later be described in more detail.

Similarly, during manual operation the output voltage of the automatic controller 30 is maintained at its maximum negative value of −25 volts to maintain the emitter 94 negative with respect to the base 98. The maximum negative output of controller 30 is produced by terminating the reset action produced by capacitor 36, and by means of switch 80 and contacts $R_6$ connecting a D.-C. source 102 through a resistor 101 to the capacitor 36 to produce a substantial negative voltage drop across said capacitor and the feedback circuit of controller 30. When the switches 80, 82 and 84 are actuated to transfer to automatic operation a source 104 of opposite polarity arrangement with respect to source 102 and of substantially greater magnitude is connected in series with source 102 and capacitor 36 by switch 80 to cause the voltage drop across capacitor 36 and feedback circuit to become positive at a substantially linear rate dependent on the time constant of the circuit. As the voltage drop across capacitor 36 becomes more positive, the output voltage of controller 30 will undergo a voltage sweep toward the positive end of its range until a point of coincidence is reached when the manual control voltage is substantially equal the automatic control voltage. The transistor 90 will conduct at the instant the manual control voltage becomes slightly more negative than the automatic control voltage to energize relay S and effect transfer of control through the agency of relay R.

The specific circuitry of the various relay contacts to accomplish the above described general operation of the system will become apparent from the following more specific description of the circuit operation.

Assume first that the system is being operated automatically in accordance with the variations in the flow rate in conduit 12, the switches 80, 82 and 84 being in their "Automatic" positions. Relay R is energized through a circuit established by holding contacts $R_3$ and contacts $S_1$, and also through a parallel circuit established by switch 82 and contacts $R_3$. Thus contacts $R_2$ will be closed to connect the controller 30 to the positioning device 42 and contacts $R_1$ will be open to disconnect the manual controller 48. Contacts $R_6$ will be open to break the circuit to source 104.

As previously mentioned during automatic operation the contact arm 58 is maintained at the upper end of the slidewire 54 to produce a maximum positive potential on the contact arm 58. This is accomplished by a shunt energizing circuit for motor 60 established by contacts $R_4$ and switch 84. This circuit shunts the manually operative switch 72 to effect positioning of the contact arm 58 toward the upper positive end of the slidewire 54. As a result the contact arm 58 is positioned to its maximum upper position where limit switch 76 is actuated to break the shunt energizing circuit. The potential thus established at contact arm 58 prevents the base 98 of transistor 90 from becoming more negative than emitter 94 thus maintaining the transistor 90 non-conductive and preventing energization of relay S. During automatic operation contacts $R_5$ are open to break the circuit through switches 70 and 72 and prevent manual positioning of the contact arm 58.

Assume now that it is desired to transfer control of valve 10 from controller 30 to manual controller 48. To accomplish this the switches 80, 82 and 84 are actuated as a unit to effect engagement of their respective switch arms with the "Manual" contacts M shown on the drawing. Actuation of switch 82 is ineffective to deenergize relay R since an energizing circuit is completed through contacts $S_1$ and holding contacts $R_3$. Actuation of switch 80 is effective to disconnect the source 104 from the capacitor 36 and connect the source 102 thereto but the modified circuit is not completed since contacts $R_6$ remain open.

Actuation of switch 84 breaks the shunt energizing circuit for motor 60 through contacts $R_4$ around switch 72 previously described and establishes an equivalent shunt energizing circuit through contacts $R_4$ around switch 70. As a result the motor 60 will be energized to position the contact arm 58 toward the negative end of the slidewire 54 and to effect a voltage sweep of the manual control voltage through its range of variation.

As the manual control voltage at contact arm 58 varies from its maximum positive value toward its maximum negative value during the voltage sweep, a condition of coincidence will be reached wherein the automatic and manual control voltages are substantially equal. At this condition of coincidence the transistor 90 will become conductive as the manual control voltage becomes slightly negative with respect to the automatic control voltage as previously described to effect temporary energization of relay S. As a result contacts $S_1$ will open to break the energizing circuit for relay R and contacts $S_2$ will close to permit reenergization of relay R upon reenergization of relay S during a subsequent transfer back to automatic operation.

As a result of deenergization of relay R, contacts $R_2$ and $R_1$ will open and close respectively to connect the manual controller 48 to the positioning device 42 and disconnect the automatic controller 30. Contacts $R_4$ will open to terminate the voltage sweep operation of contact arm 58 and contacts $R_5$ will close to permit selective manual energization of motor 60 by manual actuation of switches 70 and 72. Holding contacts $R_3$ will open to prevent energization of relay R when relay S is subsequently deenergized.

Contacts $R_6$ will close with deenergization of relay R to complete the circuit through source 102 to capacitor 36 blocking the reset action of controller 30 and producing a charge across capacitor 36 sufficient to drive the output of controller 30 to its maximum negative value of $-25$ volts as determined by diodes 43. As the output of controller 30 changes as the result of charging of the capacitor 36 to a negative value, the condition of coincidence of the automatic and manual control voltages will no longer exist and transistor 90 will become non-conductive causing deenergization of relay S. At this point the system is completely conditioned for manual operation and the switches 70 and 72 may be selectively actuated by the operator to effect manual positioning of the valve 10. The output voltage of controller 30 will remain at the maximum negative value thereof throughout the period of manual operation of the system as a result of the charge on capacitor 36 produced by source 102.

Assume now that it is desired to return the system to automatic operation. The switches 80, 82 and 84 are actuated to cause the movable contacts thereof to engage the contacts A. Actuation of switch 82 establishes an energizing circuit for relay R but which is not completed until contacts $S_2$ subsequently close. Switch 84 reestablishes the shunt energizing circuit for motor 60 around switch 72 to be subsequently completed upon closure of contacts $R_4$.

Actuation of switch 80 disconnects the source 102 from the capacitor 36 and connects source 104 which as previously mentioned is of substantially larger magnitude and opposite in polarity arrangement with respect to source 102. As a result the charge of the capacitor 36 will become positive at a linear rate depending on the time constant of the circuit effecting a voltage sweep of the output of controller 30 as previously described toward the maximum positive voltage output thereof. During this voltage sweep a point of coincidence will be reached wherein the manual and automatic controller outputs will be substantially equal. At the instant the manual control voltage becomes slightly more negative than the automatic control voltage the transistor 90 will conduct causing temporary energization of relay S. When relay S is thus energized contacts $S_2$ close to complete the energizing circuit of relay R through switch 82. As a result relay R is energized to establish the circuit conditions previously described as existing during automatic operation, continued energization of the relay R being established by holding contacts $R_3$.

It will be apparent from the operation described above that the system disclosed establishes a smooth bumpless transfer of control between the automatic controller 30 and manual controller 48 irrespective of the direction of transfer. When a transfer is made from automatic operation to manual operation, a voltage sweep of the manual control voltage is produced, and the transfer is actually made automatically at coincidence of the two controller outputs. When it is desired to transfer from manual operation to automatic operation, the output of controller 30 is caused to undergo a voltage sweep, and the transfer is automatically made in a similar manner at coincidence of the two controller outputs. Thus, it will be apparent that the objects of the invention have been accomplished.

While only one embodiment of the invention has been herein shown and described, it will be apparent to those skilled in the art that many changes may be made in the construction and arrangement of parts without departing from the scope of the invention as defined in the appended claims.

What I claim as new and desire to secure by Letters Patent of the United States is:

1. In a control system having a control element and a device responsive to a variable electric signal for operating said control element, the combination comprising, a first controller having a variable output signal, a second controller having a variable output signal, transfer means for selectively connecting the output of one or the other of said controllers to the operating device, a member operative between positions for initiating a transfer of control of the control element from said first controller or vice versa to said second controller, means effective upon operation of said member to transfer control to either controller to automatically effect equalization of the outputs of said first and second controllers, and means responsive to a condition of coincidence of said outputs during operation of the last said means to actuate said transfer means to actually transfer control between said controllers.

2. In a control system having a final control element for controlling the magnitude of a variable, the combination comprising, a first controller having a variable output signal for operating the control element, a second controller having a variable output signal for operating the control element independently of said first controller, means for selectively connecting said first and second controller to said control element including first switch means movable between positions to initiate a transfer of control of the control element from one of said controllers to the other and second switch means for actually transferring control between said controllers, means operative in response to movement of said first switch means between positions in either direction to effect substantially a full range variation of the output signal of the controller to which control is to be transferred to, and means responsive to a condition of coincidence of the outputs of said controllers during the output signal variation to actuate said second switch means.

3. In a control system having a final control element operative to vary the magnitude of a variable, the combination comprising, a first controller having a variable output signal for operating the control element, a second controller having a variable output signal for operating the control element independently of said first controller, transfer switch means for transferring control of said control element from said first controller to said second controller and vice versa, means for automatically equalizing said variable output signals of said first and second controllers, manually operative switch means for initiating a transfer of control between said controllers and for controlling operation of said equalizing means, and means responsive to a condition of coincidence of said output signals caused by operation of said equalizing means for actuating said transfer switch means to actually transfer control from one controller to the other.

4. In a control system as claimed in claim 3 wherein said first controller is responsive to variations in the magnitude of a variable to establish a proportional output signal, and said second controller comprises a manually operative controller having a manually adjustable output signal.

5. In an electric control system, the combination comprising, a first electric controller responsive to variations in the magnitude of a variable to establish a proportional electric output signal, a second electric controller adjustable manually to establish a manually variable output signal, a final control element, a positioning device responsive to a variable electric signal for positioning said control element, relay means having energized and de-energized conditions and having switch contacts effective in one condition of said relay means to connect said first controller to said positioning device and in the other condition of said relay means to connect said second controller to said positioning device, switch means adapted to be actuated between positions for initiating a transfer of control from one controller to the other or vice versa, means associated with said first controller operative to effect a variation in the output signal of said first controller at a predetermined rate, means associated with said second controller operative to effect a variation in the output signal of said second controller at a predetermined rate, means operative upon actuation of said switch means when said relay means connects said first controller to said positioning device to effect operation of said output varying signal means of said second controller, means operative upon actuation of said switch means when said relay means connects said second controller to said positioning device to effect operation of said output signal varying means of said first controller, and means responsive to a condition of coincidence of the output signals of said first and second controllers during operation of either of said output signal varying means for reversing the condition of energization of said relay means to effect a transfer of control from one controller to the other.

6. In a control system as claimed in claim 5 wherein said second controller comprises a slidewire resistance having a movable contact arm at which said output signal is produced, a reversible electric motor for positioning said contact arm, and an energizing circuit for said motor including a pair of manually operative switches for controlling the direction and extent of rotation of said motor.

7. In a control system as claimed in claim 6 further including second switch contacts associated with said relay means and said energizing circuit effective to cause rotation of said motor to actuate said contact arm to one end of said slidewire resistance during connection of said first controller to said positioning device.

8. In a control system as claimed in claim 7 wherein said output signal varying means for said second controller is associated with said motor energizing circuit and effective when operative to cause rotation of said motor to position said contact arm towards the other end of said slidewire resistance to provide a voltage sweep of the output of said second controller when said switch means is actuated to transfer control from said first controller to said second controller.

9. In a control system as claimed in claim 5 wherein said first controller comprises an operational amplifier having an external feedback circuit including an electric capacitor for producing reset action.

10. In a control system as claimed in claim 9 wherein second contact means of said relay means are effective to apply a potential to said capacitor during connection of said second controller to said positioning device to produce an output signal of said first controller at one end of its range of variation.

11. In a control system as claimed in claim 10 wherein said voltage varying means for said first controller comprises contact means of said relay means effective to reverse the polarity of said potential upon actuation of said switch means to effect said variation in the output of said first controller.

12. In an electric control system, the combination comprising, a first electric controller having a variable voltage output signal representative of the deviation of a variable from a predetermined set point and having a predetermined range of variation, a second electric controller having a manually variable output voltage signal variable in said predetermined range, a final control element for varying the magnitude of the variable and adapted to be operated in accordance with variations in the output voltage signal of either said first or second controllers, means for selectively connecting said controllers to operate said control element and operable between positions for transferring control of said control element from one controller to the other and vice versa, means for blocking the output signals of each of said controllers at one end of said predetermined range when said control element is being controlled in accordance with the output signal of the other controller, means for terminating the blocked output signal condition of each controller prior to a transfer of control to it and to effect a full range voltage sweep of its output signal, and means responsive to a condition of coincidence of said output signals during a voltage sweep of either output signal to actuate said control transferring means to transfer control of said control element from one controller to the other.

13. In a control system having a final control element for varying the magnitude of a condition, the combination comprising, electrically operative means for operating said control element, an automatic electric controller having a variable voltage output signal representative of the deviation of a variable from a predetermined set point and having a predetermined range of variation, a second electric controller having a variable voltage output signal, transfer switch means for selectively connecting said controllers to said operating means to effect operation of said control element in accordance with the output of either controller, manually operative switch means for initiating a transfer of control between said controllers, means responsive to actuation of said manually operative switch means to transfer control to effect a voltage variation of the output of the controller to which control is to be transferred to, and means responsive to a condition of coincidence of said output signals during said voltage variation to actuate said transfer switch means to transfer control.

14. In a control system as claimed in claim 13 wherein means are provided for blocking the output signal of each controller at one end of its output signal range during control of said operating means from the other controller, and said voltage varying means is effective to unblock the output signal of the controller to which control is to be transferred to and to effect a voltage sweep variation of the output signal toward the other end of said signal range until said condition of coincidence occurs.

15. In a control system as claimed in claim 14 wherein said coincidence responsive means comprises an electric transistor having a base electrode connected to the output of one controller, an emitter electrode connected to the output of the other controller and a collector electrode and having a D.-C. voltage source connected across said emitter and said collector electrodes in series with a control relay, said transistor being conductive substantially at said condition of coincidence to energize said control relay.

16. In a control system as claimed in claim 15 wherein said transfer switch means comprises an electric relay and an energizing circuit therefor, said relay having first contacts for connecting one controller to said positioning means during deenergization of said transfer relay, second contacts for connecting the other controller to said positioning means during energization of said transfer relay and third contacts connected in a holding circuit to maintain energization of said relay upon initial energization thereof, said coincidence responsive means including contact means for said control relay operative to complete an energizing circuit for said transfer relay at said condition of coincidence when said transfer relay is initially deenergized and operative to break said holding circuit when said transfer relay is initially energized.

17. In a control system as claimed in claim 16 wherein said signal blocking means comprises a circuit established by said transfer relay to block the output signal of said automatic controller at one end of its signal range when the second controller is connected to said operating means and a circuit established by said transfer relay to block the output signal of said second controller when said automatic controller is connected to said operating means.

18. In a control system, the combination comprising a final control element, electrically operative means for operating said control element, an automatic electric controller having a variable voltage output control signal representative of the devitaion of a variable from a predetermined set point and having a predetermined range of variation, a manually adjustable controller having a manually adjustable voltage output control signal variable in said predetermined range, transfer switch means for selectively connecting said controllers to said operating means to effect operation of said control element in accordance with the output of either of said controllers, manually operative switch means for initiating the transfer of control between said controllers, means responsive to actuation of said manual operative switch means to transfer control from said automatic controller to said manual controller to effect a voltage variation in the output of said manual controller, and means responsive to a condition of coincidence of said output voltage signals during said voltage variation of said manual controller to actuate said transfer switch means to actually transfer control.

19. In a control system as claimed in claim 18 wherein said manual controller includes a slidewire resistance having a movable contact arm at which said manual control voltage is produced, and means are provided for holding said contact arm at one end of said slidewire resistance during control of said control element from said automatic controller, said voltage varying means being operative upon actuation of said manually operative switch means to actuate said contact arm toward the other end of said slidewire resistance to effect a voltage sweep variation of said manual control voltage.

20. In a control system as claimed in claim 19 wherein said coincidence responsive means comprises an electric transistor having a base electrode connected to the output of one of said controllers, an emitter electrode connected to the output of the other controller and a collector electrode, a D.-C. voltage source connected across said emitter and said collector electrodes in series with a control relay, said transistor being conductive substantially at said condition of coincidence to energize said control relay, said control relay being operative to control operation of said transfer switch means.

References Cited in the file of this patent
UNITED STATES PATENTS

| 2,589,834 | MacCullum | Mar. 18, 1952 |
| 2,734,155 | Shuck | Feb. 7, 1956 |
| 2,871,436 | Rafferty | Jan. 27, 1959 |
| 2,945,170 | Jones et al. | July 12, 1960 |